United States Patent [19]

Takahashi

[11] Patent Number: 4,520,398

[45] Date of Patent: May 28, 1985

[54] DIGITAL TELEVISION SPECIAL EFFECT WAVEFORM GENERATOR

[75] Inventor: Hiroshi Takahashi, Tokyo, Japan

[73] Assignee: Nippon Electric Co., Ltd., Tokyo, Japan

[21] Appl. No.: 420,215

[22] Filed: Sep. 20, 1982

[30] Foreign Application Priority Data

Sep. 18, 1981 [JP] Japan .................. 56-147393

[51] Int. Cl.³ ................ H04N 5/22; H04N 9/535
[52] U.S. Cl. ........................ 358/183; 358/22
[58] Field of Search ............ 358/22, 183, 182, 181

[56] References Cited

U.S. PATENT DOCUMENTS 4,266,242  5/1981  McCoy ............................ 358/183
4,409,618  10/1983  Inaba et al. ..................... 358/183

FOREIGN PATENT DOCUMENTS 53-77133  7/1978  Japan ............................ 358/183

Primary Examiner—John C. Martin
Assistant Examiner—Michael D. Parker
Attorney, Agent, or Firm—Sughrue, Mion, Zinn, Macpeak, and Seas

[57] ABSTRACT

A digital television special effect waveform generator produces a gate signal used for composing two video signals as a special effect, provided with a waveform having a soft width in which these two video signals are gradually alternated, according to the direct digital calculation of digital data consisting of a stating address, a central address and an aspect ratio of the waveform. As a result, a special effect waveform for smoothly alternating two video signals can be easily obtained with a comparatively simple digital circuit configuration prevented from the injurious influence of noise.

7 Claims, 10 Drawing Figures

FIG. I

DIGITAL TELEVISION SPECIAL EFFECT WAVEFORM GENERATOR

BACKGROUND OF THE INVENTION

The present invention relates to a digital television special effect waveform generator which generates a gate signal used for inserting one video signal into another video signal.

In a prior art television special effect waveform generator, such a gate signal for composing two video signals is produced by slicing a fundamental wave generated in an analog technique by a fading level. In this case, it is possible to obtain a good quality insertion of the video signal by applying the slice level, i.e., the fading level, with a soft width corresponding to the area where two video signals are overlapped. For instance, when two video signals are combined through a circle on a TV screen, parabolic waves in the horizontal and vertical scanning periods are used as the fundamental wave. In the prior art, the fundamental wave such as the parabolic wave is produced by an analog technique or by a partial digital technique adopting a counter circuit or an arithmetic circuit. However, even when the partial digital technique is employed, the basic process for producing the fundamental wave is not renovated to a large extent in comparision with the conventional analog technique.

Furthermore, the prior art analog technique has disadvantages that when a minute fundamental wave is produced, it is easily distorted by noise. In addition, since the quality of the produced fundamental wave, especially that of the leading and trailing edges of the wave, is dependent on the characteristics of the components contained in the prior art generator, the regulation or adjustment thereof is complicated and troublesome, and the stability thereof is hardly sufficient. Moreover, in the situation where the special effect waveform is produced under the control of a computer as has become common recently, it is necessary for the special effect waveform generator to interface directly with the computer.

SUMMARY OF THE INVENTION

An object of the present invention is to provide a digital television special effect waveform generator capable of using digital data to generate a gate signal used for forming a television signal combination through a special effect shape on a TV screen by receiving digital data.

According to the present invention, there is provided a digital television special effect waveform generator comprising a basic data producing circuit for producing basic digital data varied on each line scanning period in response to received data, i.e., a start address of a special effect shape on the TV screen in the vertical direction, a center address of the special effect shape in the vertical direction, and an aspect ratio of the special effect shape between horizontal and vertical directions, the basic digital data meaning the distance of the edge of the special effect shape from the center of the that shape on each scanning line; a sloping basic data producing circuit for producing a plurality of sloping data which are successively smaller than the basic data by a predetermined value, which is predetermined according to a soft width; a function arithmetic circuit for processing the basic data and the plurality of sloping data in response to the kind of the special effect shape; a smoothing circuit for decreasing each data delivered from the function arithmetic circuit, i.e., for centrally shifting edges of the special effect shapes on each scanning line, each shape corresponding to the processed basic data or the plurality of the processed sloping data, in response to the angle defined between the scanning line and the tangent line at the edge on the curve of the processed special effect shape; an extracting circuit for extracting variance data for one sample of digital data between two adjacent data delivered from the smoothing circuit; a memory for storing the variance data extracted by the extracting circuit; and a processing circuit for sequentially adding by the variance data or for sequentially subtracting by the variance data in each sample in response to a television scanning.

BRIEF DESCRIPTION OF THE DRAWINGS

For a better understanding of the invention, reference is made to the accompanying drawings, in which.

DESCRIPTION OF THE PREFERRED EMBODIMENTS

Figure 1:
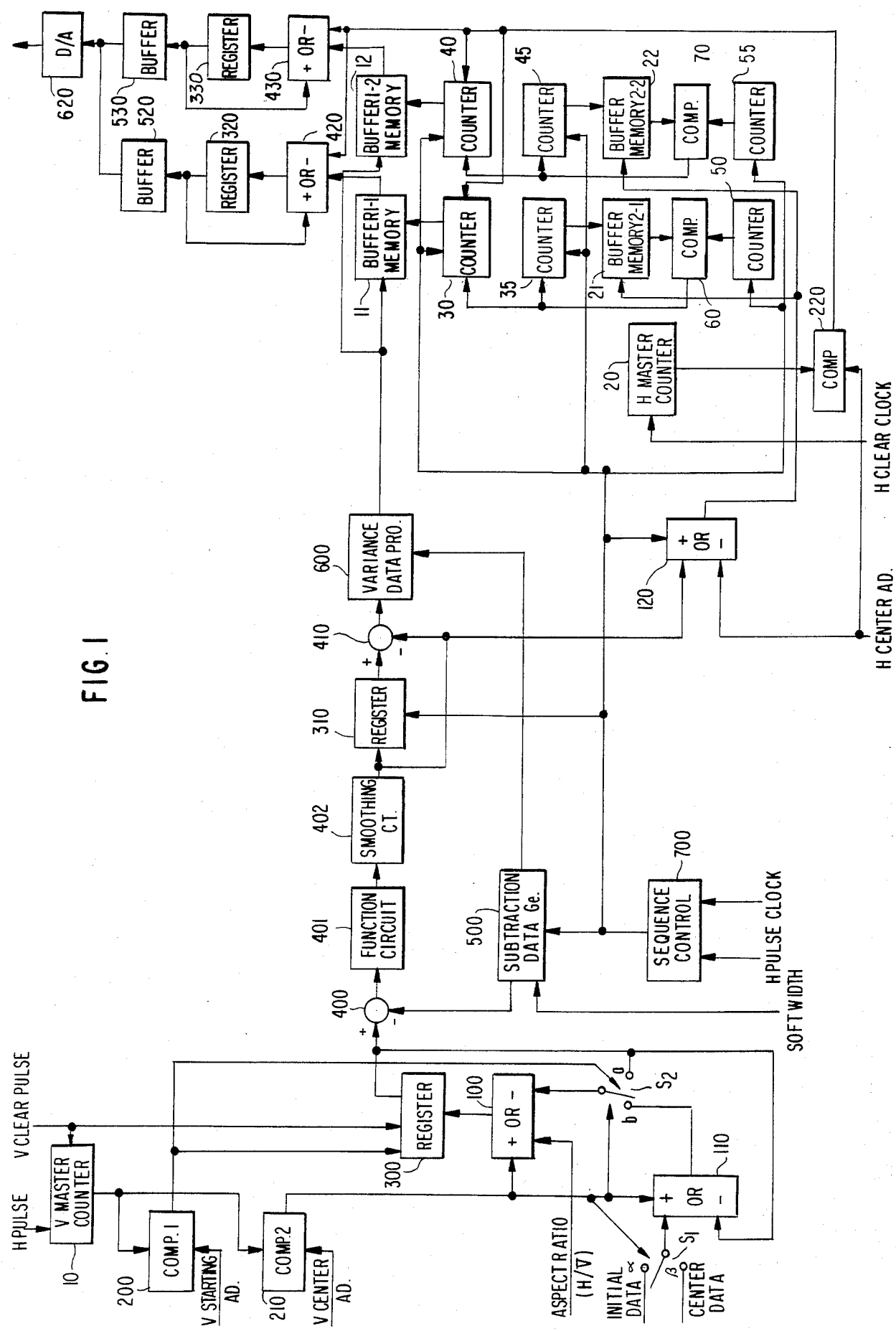
FIG. 1 is a block diagram showing an embodiment of the present invention.

FIG. 1 shows an embodiment of a digital television special effect waveform generator according to the present invention, which will be explained in detail by referring thereto. In FIG. 1, a starting address in the V-direction, a central address in the V-direction, a central address in the H-direction, an aspect ratio of the special effect shape between the H- and V-directions, H and V pulses, and a clock pulse are employed as input signals for a desired special effect shape on a TV screen.

Firstly, the generation of the aforesaid basic data will be explained by referring to FIG. 1. In FIG. 1, a V-direction master counter 10 counts horizontal synchronizing pulses (H) as clock pulses, and is cleared by a V pulse indicating the vertical blanking. A comparator 200 receives the output of the counter 10 and the starting address data in the V direction, and an output thereof is obtained when the output of the counter 10 amounts to the starting address in the V-direction. A comparator 210 receives the output of the counter 10 and the central address data in the V-direction, and an output thereof is obtained when the output of the counter 10 amounts to the central address in V-direction. As a result, the comparator 200 produces the output at the starting address in V-direction, and an operation of a register 300 is started thereby. The register 300 is applied with an output of an adder-subtracter 100, which receives the aspect ratio (H/V) and data derived from a switch S2. The switch S2 is used for selecting either one of an output of the register 300 and an output of an adder-subtracter 110. At this switch S2, the output of the adder-subtracter 110 is selected only when the outputs of the comparators 200 and 210 are obtained, while the output of the register 300 is selected in any other case. The adder-subtracter 110 selectively receives the output of the register 300 and either one of an initial data $\alpha$ and a central data $\beta$ which are previously set up through a switch S1.

When the output of the comparator 200 is firstly obtained indicating that the result counted by the V-direction master counter 10 amounts to the starting address in the V-direction, the adder/subtracter 100 is operated as an adder, and, in a horizontal (H) scanning period in which the addition thereof is started, an amount $\{H/V+\alpha\}$ is set up in the register 300 through the switch S1, the adder-subtracter 110, the switch S2 and the adder-subtracter 100, and then, in every horizontal scanning period, only the aspect ratio H/V is added thereto. The initial data $\alpha$ is determined by the following equation (1), in which ASV denotes the starting address in the V-direction.

$$\alpha = H/V\{1 - \text{Frac}(ASV)\} \quad (1)$$

When the result counted by the V-direction master counter 10 amounts to the central address in the V-direction, the output of the comparator 210 is obtained, and, as a result, the adder-subtracter 100 is operated as a subtracter, and the adder/subtracter 110 is also operated as a subtracter. In addition, the switch S1 selects the central data $\beta$ in response to the output of the comparator 210, while the switch S2 selects the output of the adder-subtracter 110 in response to the output of the comparator 200, so that the output of the register 300 is changed into the compensated data, and hence the central data $\beta$ is determined by the following equation (2), in which AMV denotes the central address.

$$\beta = 2 H/V\{1 - \text{Frac}(AMV)\} \quad (2)$$

Thereafter, the adder/subtracter 100 is operated in the subtraction mode, in which the aspect ratio H/V is subtracted in every horizontal scanning period H. As a result, the basic data derived from the register 300 becomes as indicated by Sb in FIG. 2.

Figure 3A:
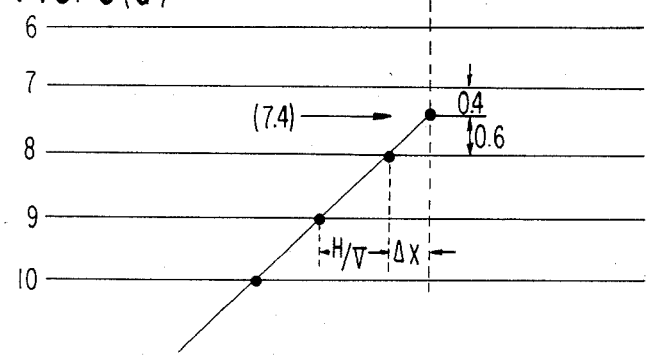
FIGS. 3(a), 3(b), 3(c) and 3(d) are diagrams showing principles of the generation of the basic data, particularly, principles of the initial data and the central data, respectively.
Figure 3B:
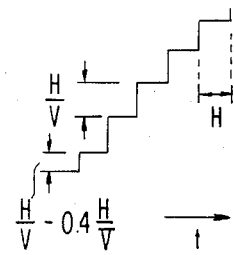
Figure 3C:
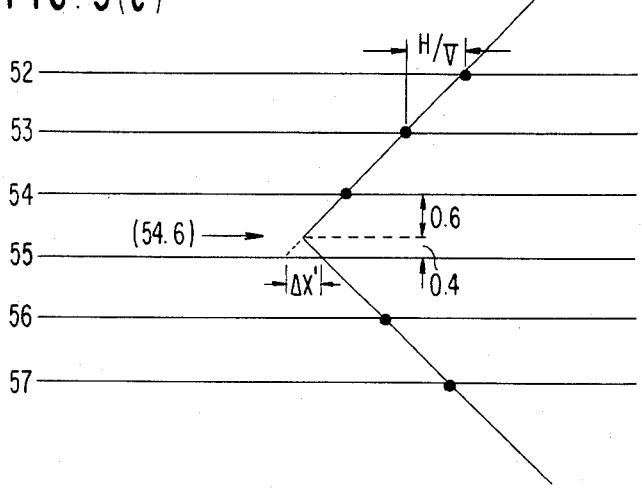
Figure 3D:
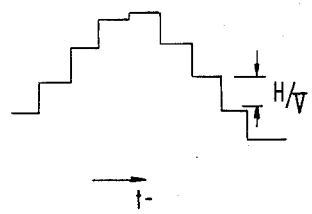

FIGS. 3(a), 3(b), 3(c) and 3(d) are prepared for explaining principles of the initial data compensation and the central data compensation in the generation of the basic data. In FIG. 3(a), when the starting address in the V-direction is set up at the line number 7.4, Frac (ASV)=0.4 is settled, so that $\Delta x$ is represented by $(H/V - 0.4 \times H/V)$, and hence the output of the basic data approximates a straight line as shown in FIG. 3(a). However, the actual output data becomes as shown in FIG. 3(b). In the embodiment shown in FIG. 1, the basic data Sb starts from the data (H/V+$\alpha$), that is, the data on the line 8 shown in FIG. 3(a) is not produced in the embodiment. In FIG. 3(c), when the central address in the V-direction is set up at the line number 54.6, Frac (AMV)=0.6 is settled, so that $\Delta x'$ is represented by $2(H/V - 0.6 \times H/V)$, and hence the output of the basic data is varied as indicated by straight lines as shown in FIG. 3(c). The actual output data assumes a step waveform as shown in FIG. 3(d).

Figure 2:
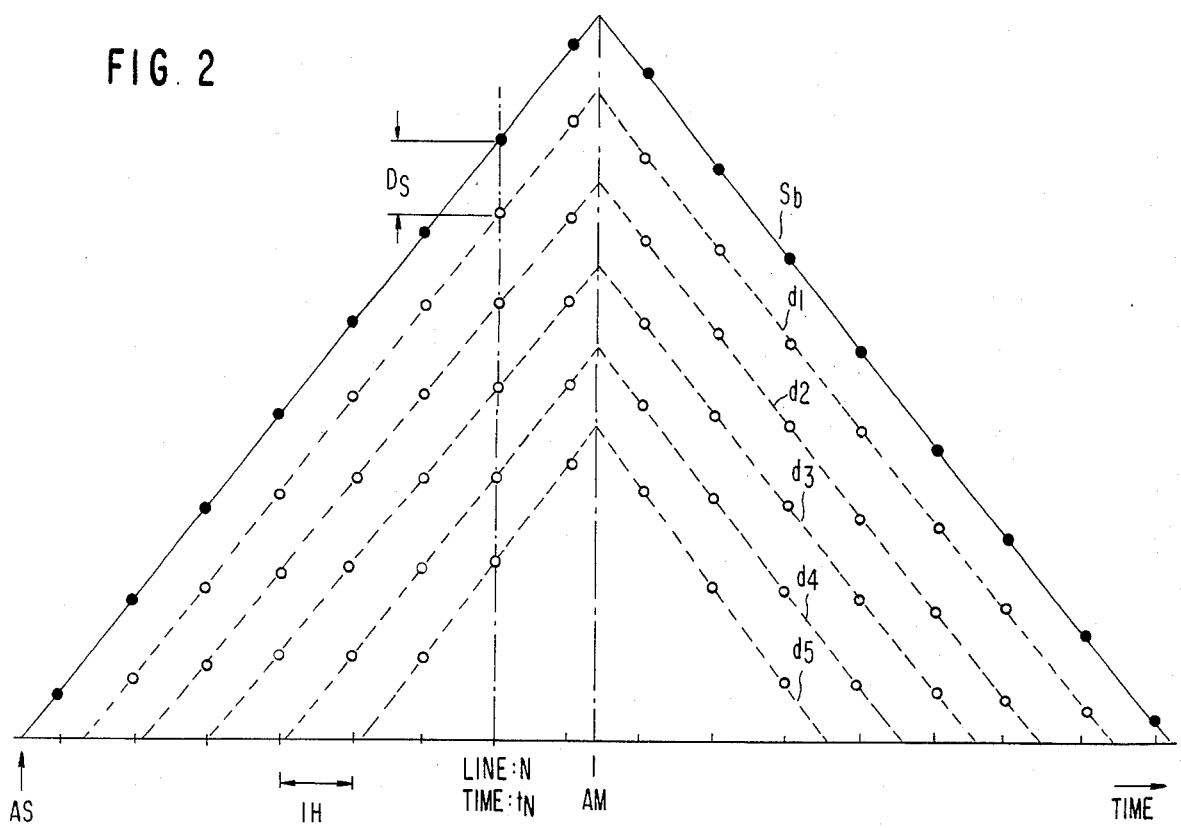
FIG. 2 is a diagram showing examples of basic data and a plurality of sloping data produced in the embodiment as shown in FIG. 1.

In a subtracter 400, a predetermined subtraction data generated in a subtraction data generator 500 is successively subtracted from the basic data delivered from the register 300 in order to produce a plurality of sloping basic data after the basic data $S_b$ is passed from the subtractor 400. This predetermined data is defined according to a soft width applied externally. In FIG. 2 showing the operation to produce the plurality of sloping data, the predetermined subtraction data $D_S$ delivered from the slope data generator 500 is successively subtracted from the basic data $S_b$. As a result, the basic data $S_b$ and the plurality of sloping basic data $d_1$, $d_2$, $d_3$, $d_4$ and $d_5$ are produced. In FIG. 2, actually, the basic data $S_b$ and sloping data $d_1 \sim d_5$ are shifted as a stairform as shown in FIGS. 3(b) and (d). As shown in FIG. 2, the number of the data production points in each line is changed. In the line N, for example, six of the data $S_b$, $d_1$, $d_2$, $d_3$, $d_4$, and $d_5$ are produced and expressed by $(S_b - n \cdot d_s)(n=0, 1, 2, \ldots, 5)$. The difference between the basic data $S_b$ and the smallest sloping basic data $d_5$ corresponds to the soft width. Accordingly, the basic data corresponds to an outer circumference of the special effect shape, while the smallest sloping basic data corresponds to an inner circumference. Furthermore, each line showing the data $S_b$ and $d_1 \sim d_5$ indicates a portion having the same signal level of the final gate signal for the television special effect, and the lines each having the same signal level are defined at contour lines, hereinafter. From the slope data generator 500, level differences between respective adjacent contour lines are further generated in synchronism with the generation of the subtraction data $D_s$. These level differences between two adjacent contour lines are previously programmed so as to vary the characteristic of the final gate signal.

Figure 3E:
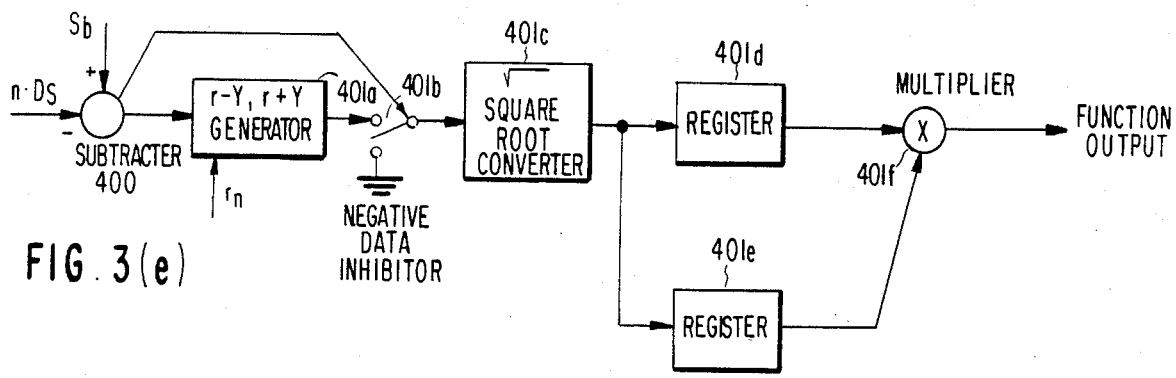
FIG. 3(e) is a diagram showing a function arithmetic circuit for generating a circular waveform as an example of the function arithmetic circuit.
Figure 4:
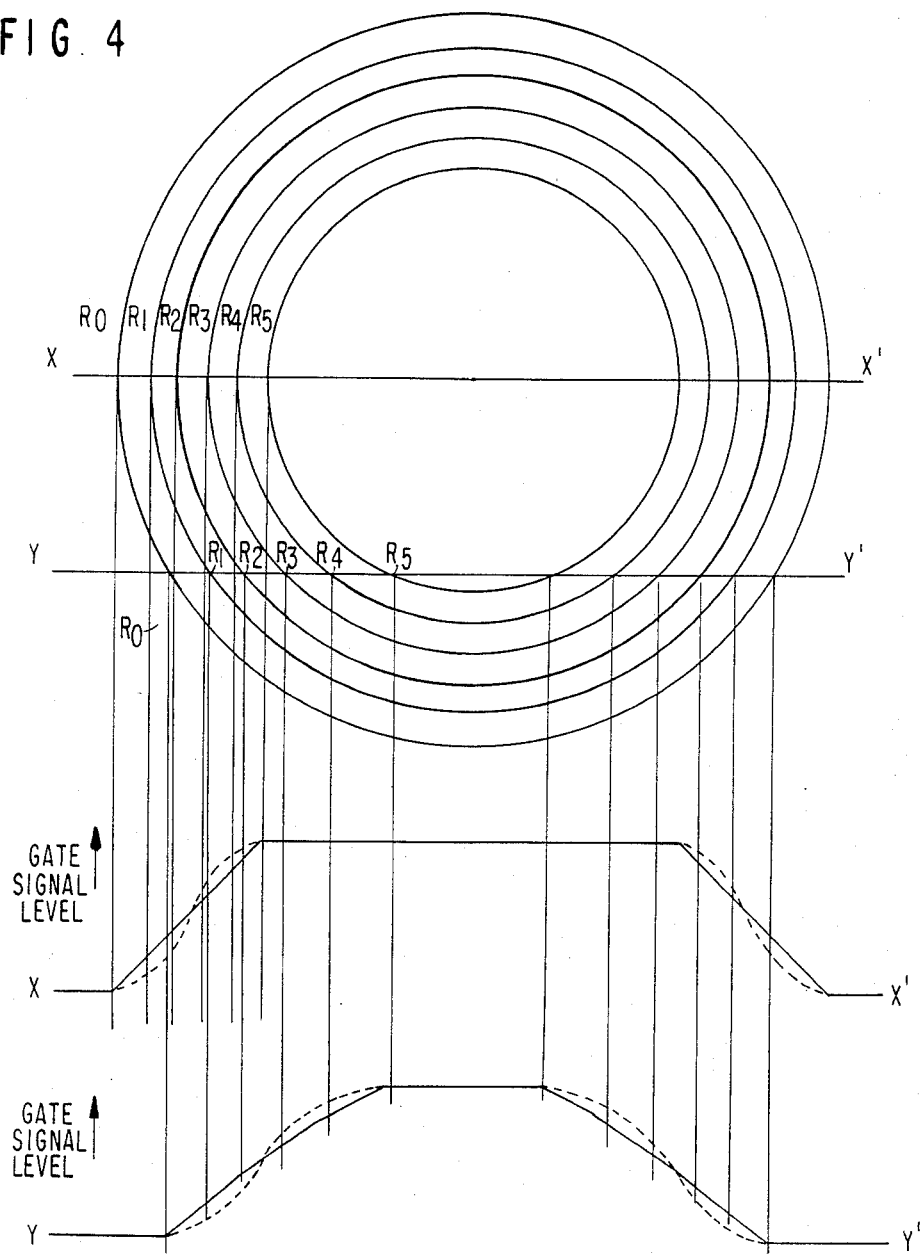
FIG. 4 is a diagram showing the operation of the embodiment as shown in FIG. 1.

Next, the data derived from the subtracter 400 are supplied to a function arithmetic circuit 401 which converts the set of the data shown in FIG. 2 into a set of data showing a desired shape, for example, a circular shape. The arithmetic circuit 401 for obtaining the circular shape will now be explained. For an example, the function arithmetic circuit employed for obtaining a circular shape as the special effect shape on the TV screen is shown in FIG. 3(e). In this function circuit 401, the data $(S_b - n \cdot D_s)(n=0, 1, 2, \ldots, 5)$ derived from the subtracter 400 as shown in FIG. 1 is applied thereto as an input; a calculation of $(r_n - y)$ and $(r_n + y)$ is effected in time division with respect to a radius r of a circle and a V-direction y (corresponding to the distance between center point O of the circular shape and center point O' on the scanning line as shown in FIG. 4, to be described later) by a $(r_n - y)$, $(r_n + y)$ generator 401$_a$ with the value of y being given by $(r_n - (S_b - n \cdot D_s))$; the calculated $(r_n - y)$ and $(r_n + Y)$ are applied through a negative data inhibitor 401$_b$ to a square root converter 401c, in which square roots $\sqrt{r_n - y}$ and $\sqrt{r_n + y}$ are obtained; and those square roots $\sqrt{r_n - y}$ and $\sqrt{r_n + y}$ are applied, respectively, through registers 401$_d$ and 401$_e$ to a multiplier 401$_f$ in which a calculation of $\sqrt{r_n^2 - y^2}$ is effected. In this case, the value of y is equal to $\{r_n - (S_b - nD_S)\}$.

As mentioned above, data of $\sqrt{r_n^2 - y^2}$ are successively obtained in time division, and, as a result, data $r_n$ can be obtained for as many data as are derived from the subtraction data generator. Consequently, with respect to one V-direction address, it is possible to obtain as many values of $\sqrt{r_n^2 - y^2}$ as there are data $r_n$, so that all of points corresponding to the same data $r_n$ are disposed on the same contour in a three dimensional space.

The above-mentioned case is shown in FIG. 4. In this figure, points R$_0$ to R$_5$ indicate points which are calculated by the function arithmetic circuit 401, and points $R_0, R_1, \ldots, R_5$ on different scanning lines, for example, X—X' and Y—Y' indicate points having the same signal level of the gate signal, respectively. The gate signals on the scanning lines X—X' and Y—Y', which will be produced by following processes explained in detail, are shown in the lower portion of FIG. 4. The composition of two video signals in response to the gate signal will now be explained. During the period of the bottom level of the gate signal, one video signal is multiplied by a gain of "1" and another video signal inserted into the circular shape is multiplied by a gain of "0", i.e., inhibited, while during the period of the upper level of the gate signal, the one video signal is multiplied by a gain of "0" and the other video signal is multiplied by a gain of "1". During the soft width $\overline{R_0R_5}$, the two video signals are mixed, alternatively, in response to the gate signal level. In the embodiment, the periods between respective adjacent points, i.e., $\overline{R_0R_1}, \overline{R_1R_2}, \ldots, \overline{R_4R_5}$ are approximated by straight lines for producing the gate signal as shown in FIG. 4.

Accordingly, data $r_0$ to $r_5$ derived from the function arithmetic circuit 401 indicate the distance of the points $R_0$ to $R_5$, respectively, from the center of the circular shape as the special effect shapes on the TV screen.

Figure 5A:
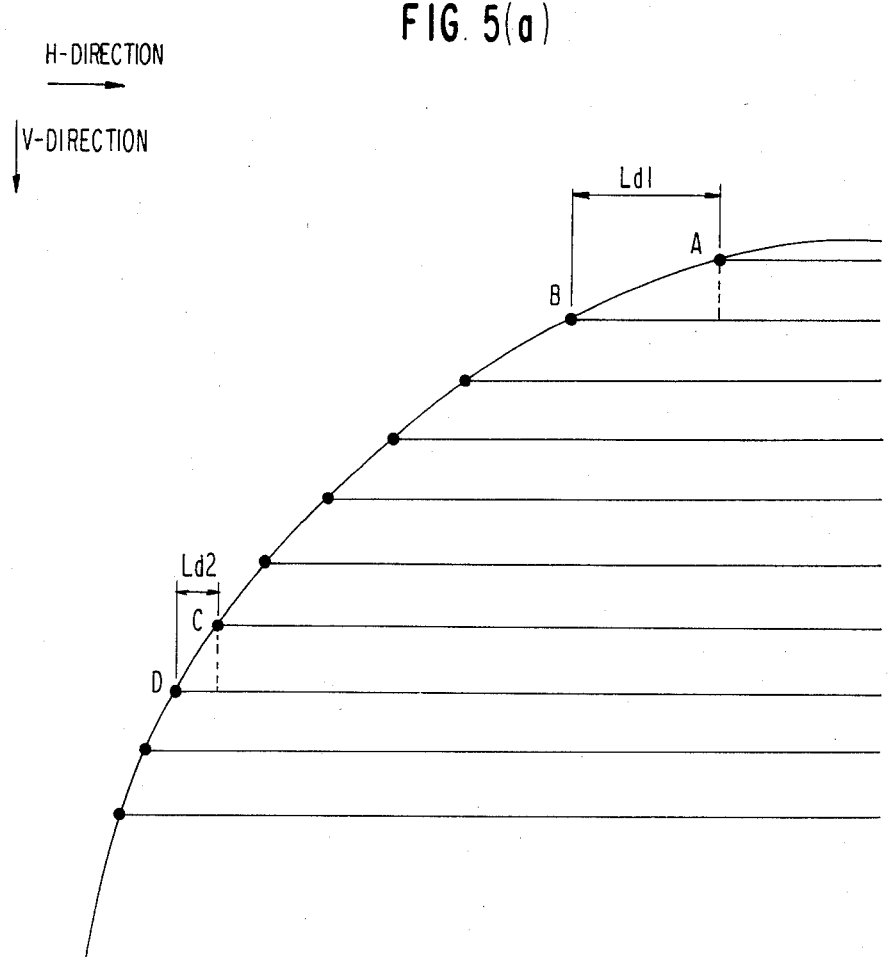
FIGS. 5(a) and 5(b) are diagrams showing the operation of a smoothing circuit employed in the embodiment as shown in FIG. 1.
Figure 5B:
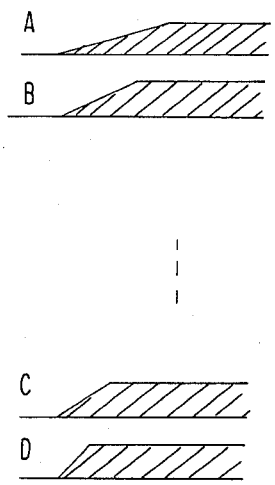

Next, a smoothing circuit 402 is provided for compensating the build-up characteristic of th edge of the special effect shape on the TV screen in response to the gap of the start points thereof between adjacent lines. Referring to FIG. 5(a), start points A, B, C and D forming the special effect shape on the respective scanning lines are different each other. If the same built-up characteristic is used for these start points, the curve near points A and B visually appears as a stair like contour on the TV screen. This is particularly true where the soft width is narrow, i.e., the soft width is nearly equal to the one cycle subcarrier period. In the smoothing circuit 402, for example, the start points A and C are shifted closer to the center of the circular shape in response to respective distances $L_{d1}$ and $L_{d2}$, i.e., the angles between the scanning lines and the tangent lines at the points A and C, respectively. FIG. 5(b) shows visual effects of such compensation in the smoothing circuit 402 at the points A, B, C and D. Of course, plural data corresponding to respective contour lines on each scanning line are also compensated as described above.

By the combination of a register 310 and a subtracter 410, the distances $\overline{R_0R_1}, \overline{R_1R_2}, \ldots, \overline{R_4R_5}$ indicating the distance between two adjacent contour lines are obtained as shown in FIG. 4. Thereafter, a variance data producing circuit 600 responsive to the distance between two adjacent contour lines derived from the subtracter 410 and the level differences between respective adjacent contour lines derived from the subtraction data generator 500 extracts variance data per one sample of digital data with respect to each distance $\overline{R_{(i-1)}R_i}$ ($i=1, 2, \ldots, 5$). Therefore, it is possible to arbitrarily vary the slope characteristic of the gate signal by changing the level differences derived from the subtraction data generator 500 in each distance between two adjacent contour lines.

For instance, the gate signal indicated by broken lines X—X' Y—Y' show the S-shaped slope characteristics, respectively. In these cases, the significance of the signal level is selected to 0.5 between $R_0$ and $R_1$, 1 between $R_1$ and $R_2$, 2 between $R_2$ and $R_3$, 1 between $R_3$ and $R_4$ and 0.5 between $R_4$ and $R_5$, respectively. The number of variance data per one sample obtained from the variance data producing circuit 600 as mentioned above is smaller by one than that of the contour lines in each scanning line, and the variance data group is alternatively stored in buffer memories 11 and 12. The reading out from these buffer memories 11 and 12 is carried out alternately in every other line, so that it is possible to generate the gate signal on a real time basis. On the other hand, the positions of the outer circumference and the contour lines in each line of the gate signal are stored in buffer memories 21 and 22 and read out therefrom in real time also. The storing and the reading out of those buffer memories 21 and 22 are carried out alternately in every other line similarly as in the buffer memories 11 and 12.

The remaining circuit configuration following the variance data producing circuit 600 as shown in FIG. 1 will be explained hereinafter in detail. From the above-mentioned smoothing circuit 402, the distance data $r_0, r_1, \ldots, r_5$, which show the distances of the respective contour lines from the center of the circular shape on each scanning line, are derived. These distance data are applied to an adder/subtracter 120, in which the addition and the subtraction by the central address $M_h$ in the horizontal (H)-direction are effected therewith, so as to derive $(M_h-r_0)$, $(M_h+r_0)$, $(M_h-r_1)$, $(M_h+r_1)$, ..., $(M_h-r_5)$, $(M_h+r_5)$ therefrom. These calculated data indicate the absolute positions of the respective contour lines on each horizontal line, and are stored in the buffer memory 21. On the other hand, the variance data, i.e., increasing levels per one sample between the respective contour lines, are stored in the buffer memory 11. A counter 30 is provided for generating writing and reading addresses corresponding to the buffer memory 11, while a counter 35 is provided for generating writing and reading addresses corresponding to the buffer memory 21. A counter 50 cleared at every horizontal timing generates the counted data representing the absolute position in the horizontal scanning line, which data are applied to an input of a comparator 60. Another input of the comparator 60 receives the initial data $(M_h-r_0)$ which is read out from the buffer memory 21. In a case where the data counted by the counter 50 amounts to between zero and $(M_h-r_0)$, i.e., before the point $R_0$, an increasing level "zero" is derived from the buffer memory 11. When the data counted by the counter 50 amounts to $(M_h-r_0)$, an output of the comparator 60 is applied to the counters 30 and 35, so that the addresses of the buffer memories 11 and 21, which are derived from the counters 30 and 35, respectively, are incremented, respectively. As a result, an increasing level $\Delta d_1$ per one sample corresponding to the distance $\overline{R_0R_1}$ is derived from the buffer memory 11, and then successively added at every sample point of the digital data by the combination of a register 320 and an adder/subtracter 420. The added result is derived through a buffer register 520 and a D/A converter 620 as the gate signal representing the special effect shape on the TV screen.

Then, the succeeding data $(M_h-r_1)$ derived from the buffer memory 21 is compared with a counted result of a counter 50 in the comparator 60. Accordingly, when the counted result of the counter 50 amounts to $(M_h-r_1)$, the counters 30 and 35 are incremented again in response to the output of the comparactor 60. As a result, an increasing level $\Delta d_2$ per one sample corresponding to the distance $\overline{R_1R_2}$ is derived from the buffer memory 11, and then successively added to the preceding data in the combination of the register 320 and the adder-subtracter 420, while the succeeding data ($M_h - r_2$) is derived from the buffer memory 21. The above added result is derived as the gate signal through the buffer 520 and the D/A converter 620. Similarly as mentioned above, the address counters 30 and 35 are successively incremented in response to the increase of the counted result of the counter 50, and hence the increasing levels between the adjacent contour lines and the data indicating the position of the succeeding contour line are successively derived from the buffers 11 and 21. Consequently, the gate signal representing the special effect shape as shown in FIG. 4 can be obtained.

On the other hand, an H master counter 20 also carries out the similar counting as the counter 50 in response to the horizontal scanning timing, and the counted result is compared with the central address $M_h$ in the H-direction in a comparator 220. Hence, hence a resultant coincidence output is applied to the address counters 30 and 40 and the adder-subtractors 420 and 430. In the address counter 30, after the coincidence output is received, the counted result is decreased whenever the output of the comparator 60 is applied thereto, so that the operation of the adder/subtracter 420 is changed to the subtraction. This is because, in the present embodiment, only the special effect shape on the TV screen, which is symmetrical in the horizontal direction with respect to the vertical center line, is considered, and hence only the data regarding the left half of the TV screen is contained in the basic data derived from the register 300 as shown in FIG. 1. Accordingly, in the adder/subtracter 120, the central address $M_h$ in the H-direction is related to the data $r_0$ to $r_5$ indicating the respective positions of contour lines from the center of the special effect shape, which data are derived from the smoothing circuit 402, so as to obtain the data indicating the positions of the contour lines extended over the whole area of the TV screen.

In FIG. 1, the buffer registers 520 and 530, the registers 320 and 330, the adder-subtracters 420 and 430, the buffer memories 11 and 12, the address counters 30 and 40, the buffer memories 21 and 22, the address counters 35 and 45, the comporators 60 and 70, and the counters 50 and 55 are similar to each other respectively. In these two similar combined circuitries, writing and the reading of the buffer memories contained therein are alternately effected on every other line respectively, so as to obtain the special effect in the real time. The sequence controller 700 as shown in FIG. 1 controls the generation timing of the subtraction data generator 500, the exchanging between the addition and the subtraction in the adder-subtracter 120 and the exchanging between the writing and the reading in the buffer memories 11, 12, 21 and 22 on every other line respectively.

What is claimed is:

1. A digital television special effect waveform generator for generating a gate signal used for composing two video signals through a special effect shape on a video screen having a plurality of scanning lines, comprising:
   first producing means (300), responsive to position data with respect to said special effect shape, for producing basic data corresponding to each scanning line;
   second producing means (400) responsive to said basic data for producing at least one subtracted basic data by subtracting a predetermined data from said basic data;
   means (401) for converting said basic data and said at least one subtracted basic data into data indicating said special effect shape on a television screen, respectively; and
   means (600, 11, 30, 420, 320) for generating an interpolated data sample between two adjacent data derived from said converting means so as to generate said gate signal.

2. The digital television special effect waveform generator as claimed in claim 1, wherein said interpolating means includes
   means for detecting a variance level for each sample of data to be interpolated between two adjacent data derived from said converting means, and
   means for successively adding said variance level to generate a plurality of samples of said interpolated data.

3. A digital television special effect waveform generator for generating a gate signal used for composing two video signals through a special effect shape having horizontal and vertical sizes, said special effect shape having a width in which said two video signals are overlapped with each other, said waveform generator comprising:
   first producing means receiving a plurality of data indicating a start position of said special effect shape, a center position of said special effect shape and an aspect ratio between the horizontal and vertical sizes of said special effect shape, for producing basic data by repeatedly adding said aspect ratio for each scanning line when the television scanning passes said start position or by repeatedly subtracting said aspect ratio when the television scanning passes said center position;
   second producing means receiving said basic data for producing a plurality of subtracted basic data by successively subtracting a predetermined data from said basic data;
   converting means for converting said basic data and the plurality of subtracted data into a plurality of data each indicating said special effect shape;
   calculating means receiving said plurality of data derived from said converting means for calculating a plurality of position data each corresponding to the relative positions of consecutive ones of said plurality of data from said converting means on every television scanning line;
   detecting means for detecting a variance level for each one sample of data to be interpolated between two adjacent of said position data;
   storing means for storing said variance level derived from said detecting means; and
   adding means for successively adding said variance level stored in said storing means to generate a succession of interpolated samples so as to generate said gate signal.

4. A digital television special effect waveform generator as claimed in claim 3, wherein said detecting means detects said variance level in response to a comparison of first and second inputs, a first input of said detecting means being received from the output of said converting means and a second input of said detecting means comprising said predetermined data.

5. A digital television special effect waveform generator as claimed in claim 3, wherein said adding means comprises a first adder-subtractor for adding its first and second inputs and providing an output, a register for receiving and storing the output from said adder-subtractor and providing an output, the output of said register comprising said first adder-subtractor input and said variance level comprising said second adder-subtractor input.

6. A digital television special effect waveform generator as claimed in claim 5, wherein said storing means comprises at least one memory for storing a plurality of said variance levels and for reading out said variance levels in response to corresponding memory addresses, said generator further comprising means for generating a plurality of addresses corresponding to respective segments of said special effect shape, said plurality of addresses being successively provided as said memory address.

7. A digital television special effect waveform generator as claimed in claim 5, wherein said adder-subtractor successively adds said variance level in response to a first signal and successively subtracts said variance level in response to a second signal, said generator further comprising means for generating said first signal during a first portion of said special effect shape and for generating said second signal during a second portion of said special effect shape.

* * * * *

UNITED STATES PATENT AND TRADEMARK OFFICE
CERTIFICATE OF CORRECTION

PATENT NO. : 4,520,398

DATED : May 28, 1985

INVENTOR(S) : Hiroshi TAKAHASHI, Tokyo Japan

It is certified that error appears in the above-identified patent and that said Letters Patent is hereby corrected as shown below:

Abstract, line 6, "stating" should be --starting--.

Column 1, line 26, "renovated" should be --much better--;

line 61, delete (2nd occurrence) "the".

Column 4, line 25, "at" should be --as--.

Column 5, line 23, "distance" should be --distances--;

line 27, "th" should be --the--.

Column 6, line 63, "comparactor" should be --comparator--.

Column 7, line 16, delete "hence" (second occurrence);

line 41, "comporators" should be --comparators--;

line 43, before "writing" insert --the--;

line 46, after "in" delete "the".

Signed and Sealed this

Fifteenth Day of October 1985

[SEAL]

Attest:

DONALD J. QUIGG

Attesting Officer

Commissioner of Patents and Trademarks—Designate